Jan. 24, 1956

A. C. BUNBLASKY ET AL 2,732,499

LOW DISTORTION GENERATOR

Filed Feb. 9, 1952

INVENTOR.
ADOLPH C. BUNBLASKY
ALLEN K. BROWN
BY Ralph W. E. Bitner
ATTORNEY

United States Patent Office 2,732,499

Patented Jan. 24, 1956

2,732,499

LOW DISTORTION GENERATOR

Adolph C. Bunblasky, Ridgefield, and Allen K. Brown, Stamford, Conn., assignors to Sorensen & Company, Inc., Stamford, Conn., a corporation of Connecticut Application February 9, 1952, Serial No. 270,886

2 Claims. (Cl. 250—36)

This invention relates to generators employing multi-electrode gas tubes. In greater detail the invention relates to a type of relaxation oscillators using thyratron tubes in combination with a double tuned circuit.

Gas-filled triodes, generally known as thyratrons, are particularly efficient as amplifiers and oscillators because their anode-cathode resistance is quite low when in the conducting state. Their use, however, is restricted because the transition from the non-conducting to conducting states is abrupt, generally producing a bad wave form, and because the grid electrode has no control over the anode-cathode current once the tube has been fired.

The present invention overcomes these restrictions by a novel combination of tuned circuits in the anode-cathode circuit. The result is a wave form which is quite pure, containing few harmonic components, and having an overall efficiency of 85 percent or more.

One of the objects of this invention is to provide an improved generator using gas-filled triodes which avoids one or more of the disadvantages and limitations of prior art arrangements.

Another object of the invention is to increase the efficiency of triode generators and oscillators.

Another object of the invention is to reduce the distortion in the output circuit of an electronic generator.

Another object of the invention is to provide a low distortion, high efficiency oscillator which is light in weight and which compares favorably with motor generator sets which produce the same amount of power.

Another object of the invention is to provide a generator with a regulating system to produce an alternating current with constant voltage.

One feature of the invention includes a gas-filled electron discharge device controlled by a voltage applied between the grid electrode and the cathode having a predetermined frequency. The anode-cathode circuit includes a series resonant circuit and a parallel resonant circuit, both containing an inductor and a capacitor. The parallel resonant circuit is tuned to the predetermined frequency.

Another feature of the invention includes the above described circuit with the addition of a voltage regulator. A known fraction of the voltage is obtained from the output circuit and used to light the filament of an electronic diode. The diode resistance forms one leg of a Wheatstone bridge, the unbalance of which is sensed by an electronic amplifier tube. Current from the amplifier tube controls the inductance of a saturable reactor which is bridged across a part of the series tuned circuit.

Another feature of the invention includes a self-energizing oscillating circuit which includes a grid-cathode circuit inductively connected to the series resonant circuit.

For a better understanding of the present invention, together with other and further objects thereof, reference is made to the following description taken in connection with the accompanying drawings.

Figure 1:
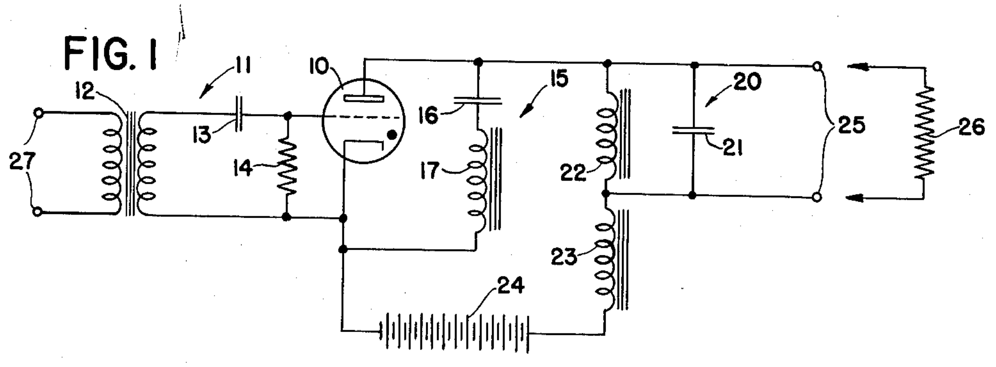
Fig. 1 is a schematic diagram of connections of the generator.

Referring now to Fig. 1, the generating circuit comprises a gas-filled triode 10 containing the usual anode, cathode, and grid electrodes. An input circuit 11 is connected between the grid and cathode and includes a transformer 12, a blocking capacitor 13 and a high resistance grid leak 14. A series resonant circuit 15 is connected between the anode and cathode and comprises a capacitor 16 and an inductor 17. A parallel resonant circuit 20 has one of its terminals connected to the anode and comprises a capacitor 21 and an inductor 22. The other terminal of the parallel resonant circuit 20 is connected to a current limiting inductor 23 which in turn is connected to the positive terminal of a source of direct current power which may be a battery 24. The negative terminal of the D. C. source 24 is connected to the cathode. Output terminals 25 are connected across the capacitor 21 and are employed to transfer the generated power to a load 26. For highest efficiency and best wave form the parallel resonant circuit must be tuned to the frequency of the input wave.

Figure 4:
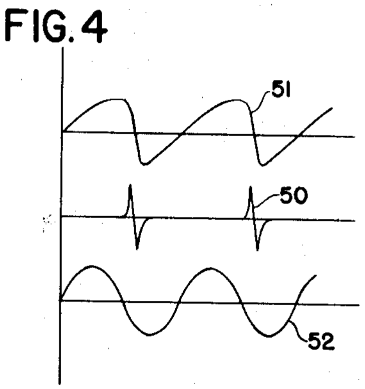
Fig. 4 is a graph showing characteristic wave forms produced across parts of the generator circuit.

The operation of this circuit is as follows: An external source of alternating current power (not shown) is connected to input terminals 27. This source is set at a predetermined frequency which is also the resonant frequency of the parallel circuit 20. The external source is of sufficient magnitude to fire the gas-filled triode 10 once during each positive part of the cycle. When the triode 10 is fired, the anode-cathode current in the tube increases from zero to a maximum value in a short time interval, discharging capacitors 16 and 21. The sudden discharge of these capacitors removes the voltage from the anode and conduction through the tube stops very soon after it started. The anode-cathode current therefore comprises a single pulse of short duration, occurring once each cycle, and of a magnitude which approximates the allowable maximum value of the tube. Characteristic wave forms are shown in Fig. 4 indicating the wave action in circuit 16, 17.

After the starting transients have died out, the circuit operates in a harmonic manner, the charging currents of capacitors 16 and 21 being supplied largely by the variations in current through inductors 17 and 22 in a well-known manner of resonant circuits. It is a well-known fact that a resonant series circuit such as 16 and 17 presents a low impedance at the resonant frequency while a parallel circuit such as 21 and 22 presents a very high impedance at the resonant frequency. For this reason, a circuit "separator" must be used to isolate the two circuits and prevent undesirable reactions. Inductor 23 is employed for this purpose. Detuning circuit 16, 17 a small amount also helps to eliminate interaction between the series and parallel tuned circuits.

Figure 2:
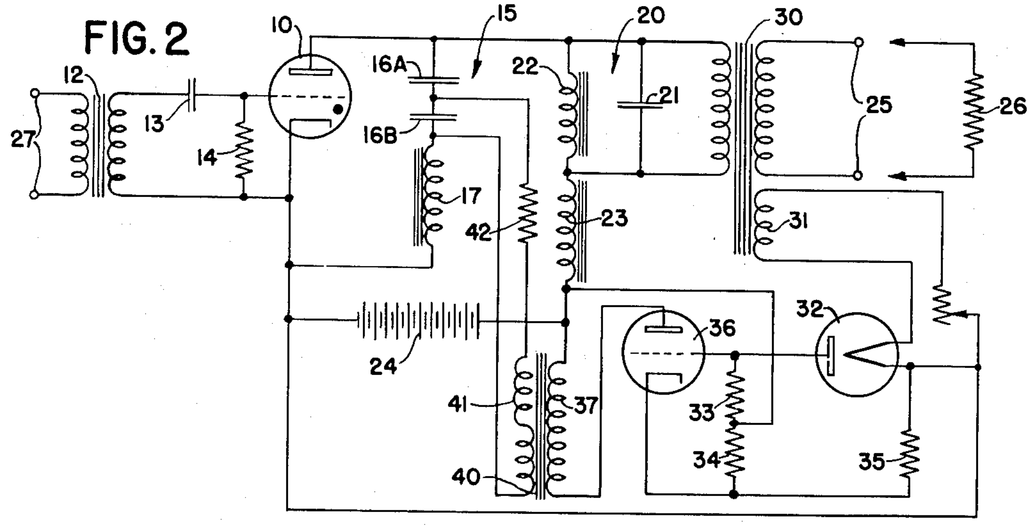
Fig. 2 is a diagram of connections similar to Fig. 1 with the addition of a voltage regulating circuit.

The circuit in Fig. 2 is similar to that shown in Fig. 1 but has an added regulating device for keeping the output voltage constant. All the generating circuit elements are the same as described above except the capacitor 16 is replaced by two capacitors 16A and 16B, connected in series. Instead of connecting the output terminals 25 directly across the capacitor 21, a transformer 30 is interposed. This permits the use of a second secondary coil 31 which generates a known fraction of the output voltage and applies it to a filament of a diode regulator tube 32. The diode 32 is connected as one arm of a Wheatstone bridge, the other arms being resistors 33, 34 and 35. The bridge is supplied with direct current from source 24, applied to opposite corners of the bridge circuit. The other two corners of the bridge are connected to the cathode and control electrode of amplifier tube 36 and the output of this tube runs from the anode through a coil 37 back to the positive terminal of battery 24. The coil 37 forms a part of a transformer 40, the secondary 41 being a coil wound in opposition and forming one component of a saturable reactor. Coil 41 is connected through a resistor 42 to the terminals of capacitor 16B and obviously forms part of the series tuned circuit 15.

The system of regulation employed in this circuit is similar to the regulating circuit disclosed and claimed in U. S. Patent 2,455,143, issued to E. M. Sorensen on November 30, 1948. The bridge circuit is normally in a partly unbalanced condition and the system is adjusted for equilibrium with an average anode current flowing from tube 36 through winding 37. Now, if for some reason, the voltage across output terminals 25 is increased, then the voltage generated by coil 31 will also be increased and the filament in diode tube 32 will have its temperature raised, thereby lowering the resistance between the anode and cathode in this tube. This action increases the unbalance in the bridge and changes the current flowing from the anode of tube 36 through coil 37, changing the saturation of the core in transformer 40 and producing a changed reactance in coil 41. This change in combination with capacitor 16B produces a change in tuning as well as a change in voltage across the terminals of tuned circuit 15. By proper design of coil 41 the action just described can be made to compensate for an increase or decrease in terminal voltage and the system will be regulated to produce a voltage which varies only slightly from a mean desired value.

Figure 3:
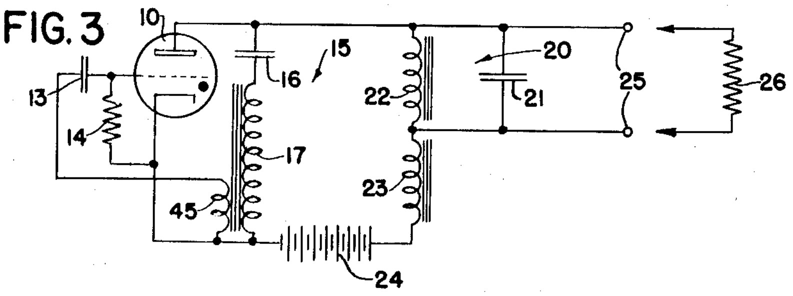
Fig. 3 is a diagram similar to Fig. 1 but having a self-excited grid circuit.

The circuit shown in Fig. 3 is similar to that shown in Fig. 1 except that the input circuit to the gas-filled tube 10 is connected to a coil 45 wound on the same core as conductor 23. This provides a feed back arrangement and permits the tube 10 with its associated circuits to act as an oscillator. The action of such an oscillator is similar to the operation of the class C oscillator, using vacuum triodes in so far as a sharp pulse is produced in the anode-cathode circuit of the tube and the tuned circuits associated with the tube produce sine wave output.

The chart in Fig. 4 shows a characteristic wave form 50 of the voltage across inductor 17 a second wave form 51 shows the voltage across capacitor 16, while the third wave form shows the output voltage at terminals 25. One circuit constructed in accordance with the design of Fig. 1 showed no appreciable change in output wave form when the load was changed from no load to full load. The distortion of this output varied from .8 percent harmonics at no load to 1.6 percent at full load.

The following values have been used in the circuit shown in Fig. 1 and are illustrative of a specific application of the invention.

| | | |
|---|---|---|
| Capacitor **16** | microfarads | 4 |
| Inductor **17** | millihenries | 12 |
| Capacitor **21** | microfarads | 4.5 |
| Inductor **22** | millihenries | 35 |
| Inductor **23** | do | 68 |
| Frequency | cycles per second | 400 |

From the above description it will be evident that the invention provides a means for generating low distortion alternating current power at high efficiency and with regulated output.

While there have been described and illustrated specific embodiments of the invention, it will be obvious that various changes and modifications can be made therein without departing from the field of the invention which should be limited only by the scope of the appended claims.

We claim:

1. An alternating current generator comprising; a gas-filled three electrode discharge device having an anode, a cathode, and a control electrode; a series resonant circuit which includes at least a capacitor and an inductor connected between the anode and the cathode; means for supplying an alternating frequency to the control electrode and the cathode; a parallel resonant circuit connected between the anode and one terminal of a second inductor, the other terminal of which is connected to the positive terminal of an anode potential supply; and tuning means connected across part of the series resonant circuit for varying the resonance and thereby changing the voltage across an output circuit.

2. An alternating current generator comprising; a gas filled three electrode discharge device having an anode, a cathode, and a control electrode; a series resonant circuit which includes at least a capacitor and an inductor connected between the anode and the cathode; means for supplying an alternating frequency to the control electrode and the cathode; a parallel resonant circuit connected between the anode and one terminal of a second inductor, the other terminal of which is connected to the positive terminal of an anode potential supply; output terminals coupled to the parallel resonant circuit for delivering alternating current power to a load; a sensing means coupled to said output terminals for sensing voltage variations thereon; tuning means connected across part of the series resonant circuit for varying the resonance and thereby changing the voltage across the output circuit; and coupling means between the sensing means and the tuning means for changing the tuning when the voltage changes on the output terminals.

References Cited in the file of this patent

UNITED STATES PATENTS

| | | |
|---|---|---|
| 2,288,817 | Maggio | July 7, 1942 |
| 2,502,673 | Rusk | Apr. 4, 1950 |

FOREIGN PATENTS

| | | |
|---|---|---|
| 274,076 | Switzerland | June 16, 1951 |

OTHER REFERENCES

Journal of Scientific Instruments, October 1936, vol. 13, No. 10, pages 331–333. (Copy in Div. 70.)